Nov. 22, 1927.

M. KORFF

FILTER PRESS

Filed Oct. 8, 1925

Inventor
M. Korff
By Marks & Clerk
Attys

Nov. 22, 1927. 1,650,138
M. KORFF
FILTER PRESS
Filed Oct. 8, 1925. 2 Sheets-Sheet 2
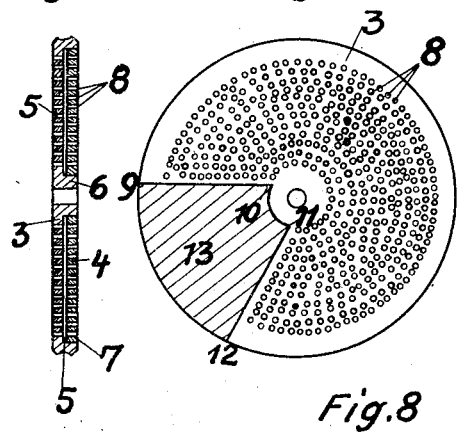
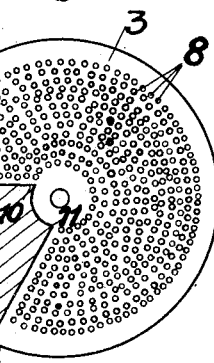
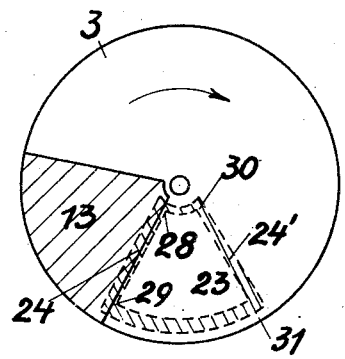
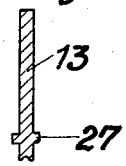
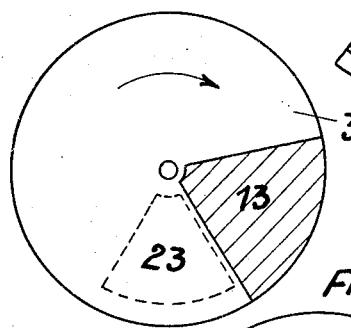
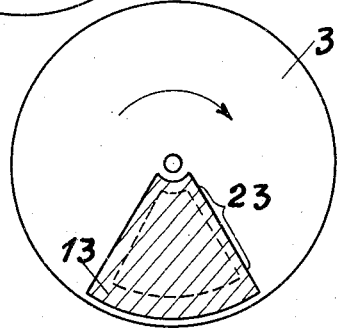
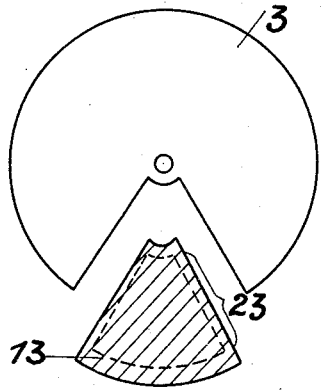
Inventor.
M. Korff
By Marks & Clerk
attys.

Patented Nov. 22, 1927.

1,650,138

UNITED STATES PATENT OFFICE.

MAX KORFF, OF NEW YORK, N. Y., ASSIGNOR TO J. P. BEMBERG AKTIEN-GESELLSCHAFT OF BARMEN-RITTERSHAUSEN, GERMANY.

FILTER PRESS.

Application filed October 8, 1925, Serial No. 61,340, and in Germany October 9, 1924.

Filter presses are already known, comprising filter bodies, which, during the filtering process, constantly move past in front of a passage aperture of smaller area than the filter body. The present invention is distinguished from the known filter presses of this kind by the fact that a part of the filter plate is constructed as a releasable screening plate, and that this part, during the changing of the filter plate, remains in front of the passage aperture and makes a fluidtight joint.

The filter according to the invention is primarily intended for highly viscous liquids or solutions, more particularly for the artificial silk industry. In the case of liquids of the kind mentioned it is not possible to effect a cleaning of the filter in the filter press itself. Instead of this it is necessary to change the filter body from time to time for a clean, unobstructed one. Now the object of the invention is to enable the filter to be simply and quickly changed. For this purpose an impermeable member forming a screening plate is inserted loosely in the filter plate, this impermeable member remaining in the filter press when the filter plate is taken out, and closing the admission and discharge apertures. When the filter body is set in rotation after the changing has been effected, it takes the screening plate with it and automatically opens the passage.

Owing to the fact that the screening plate, during the changing of the filter, shuts off the admission and discharge in a fluidtight manner, air is prevented from entering the pipes, this being a thing that has to be unconditionally prevented, in the manufacture of artificial silk for example. When the filter plate is inserted the interior of the press casing can easily be exhausted, so that even from the casing, after the reopening of the inlet and discharge, no air can enter the pipes.

In the accompanying drawings, two constructional forms of a filter according to the invention are illustrated.

Figure 1 shows a section on the line A—B or A—B' in Figure 4, in a construction comprising one filter plate 1.

Figure 2 shows a section of this constructional form on the line C—D in Figure 1, and Figure 3 shows a section corresponding to Figure 1, through a construction comprising two filter plates 1 and 1'.

Figure 4 is a side elevation of both constructions, seen in the direction of the arrows E in Figure 1.

Figure 5 shows the filter plate alone, in cross section; and

Figure 1:
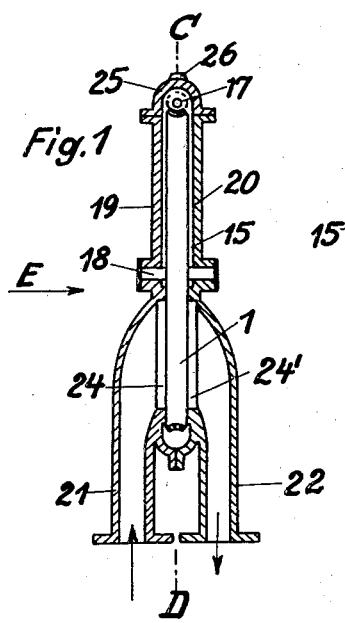
Figures 1, 2, 3 and 4 show in principle the construction of such a filter press in two constructional forms.

Figure 6 in elevation.

Figures 7, 10, 11 and 12 show the filter plate diagrammatically in various positions, during working and when stationary.

Figures 8 and 9 show a screening plate in elevation and in section respectively.

The filter plate consists for example of the two plates 3 and 4 (Figures 5 and 7) secured one on to the other, with a filter sieve or filter cloth 5 located between them. The plate 3 is constructed as a worm wheel, and is provided with a hub 6 and a bore.

The filter sieve 5 is firmly clamped by means of the annular plate 4 against the plate 3. The two plates have accurately registering apertures 8.

Furthermore the otherwise circular filter plate is cut out in a sector-shaped manner somewhat as indicated at 9, 10, 11, 12 (Figure 6), and filled up with a loose sector-shaped screening plate 13. This screening plate, of the same thickness as the assembled filter plate, that is, as the plates 3 and 4 with the enclosed filter sieve 5, has teeth on its periphery like the plate 3, and supplements the teeth of the filter plate so as to form a complete worm wheel. In contrast to the latter, however, the screening plate is not provided with apertures but is constructed as a solid plate.

Figure 2:
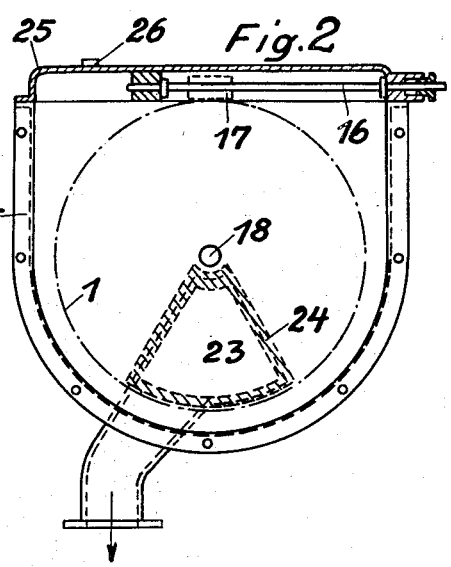

In the filter press casing 15 (Figures 1 and 2) the filter plate just described is driven by a worm 17 secured to a rotatable shaft 16. 18 is the plate shaft.

The filter casing consists of two parts, 19 and 20 (Figure 1), each of which is provided in the lower half with a pipe connection, 21 and 22 respectively. These pipe connections open into the interior of the press with sector-shaped cross sections 23, which are surrounded by flanges 24, 24' (see Figures 1 and 2). Now the relative dimensions are so selected that when the parts 19 and 20 of the press are bolted together the flanges 24 and 24' bear against the filter plate in such a way as to make a fluidtight joint.

The flanges are preferably equipped with resilient packing, in order that during the rotation of the filter plate, notwithstanding a good fluidtight closure, jamming may be prevented.

A cover 25 (Figures 1 and 2) in which the worm shaft 16 is journalled, closes the press at the top. A nipple 26 serves for connecting to an exhaust pump.

The solution to be filtered is introduced through the tubulure 21 (Figure 1) and forced by means of compressed air through the apertures 8 in the filter plate, left uncovered in front of the sector-shaped tubulure mouth.

In Figures 7, 10, 11 and 12, 23 denotes the free pipe mouth and 13 the screening plate. The filter plate rotates in the direction of the arrow.

Figure 7 shows the relative positions of the filter plate and the screening plate, which is held inside the press by means of a collar 27 (Figures 8 and 9), at the beginning of the working process. During the working process the filter plate rotates slowly in the direction of the arrow until it reaches its final position (Figure 10). The speed of this movement can be adjusted at will by known means.

Now owing to the fact that on the edge of the pipe mouth 28, 29 (Figure 7) during the rotation of the filter plate, fouled or choked passages 8 disappear behind the flange 24, and on the edge of the pipe mouth 30, 31 and the same number of clean passages emerge the central free cross-sectional area of passage always remains the same. Accordingly the constancy of the quantity of solution flowing through is unconditionally ensured.

When the filter plate has reached its terminal position (Figure 10), it must be changed for a clean one. For this purpose the plate is rotated by hand or mechanically into the position shown in Figure 11. In this position the screening plate closes the pipe mouths in a fluidtight manner and thus prevents any further flow of solution or liquid. After the filter casing cover 25 (Figure 1) is removed, and the shaft 18 taken out, the filter plate can be drawn out upwards (Figure 12). Under these circumstances the loose screening plate remains in its position, and thus guards against the entrance of air or particles of dirt into the tubulures filled with solution. The insertion of a clean filter plate is effected in the same manner as the taking out, in the reverse order.

Before the filter is restarted, however, the press casing must be completely exhausted of air. This is effected for the most part by displacing the air that has penetrated into the press casing by filling up the latter with clean liquid, the residue preferably being drawn out by means of a vacuum pump. The plate is then rotated into the position shown in Figure 7, after which the cycle of operation can recommence.

Figure 3:
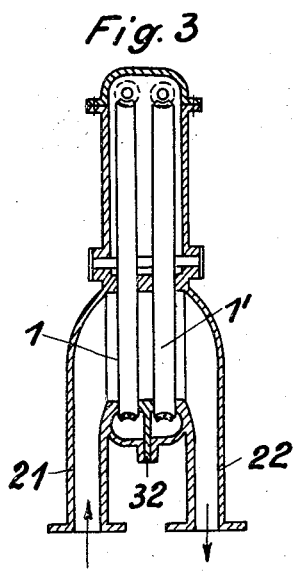
Figure 4:
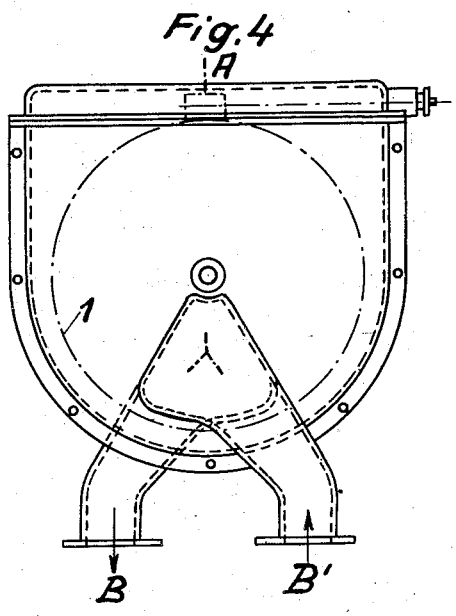

In order to make the filtration even more complete, two or more filter plates, which may be provided with progressively finer sieves, may be inserted in the casing in series. Figure 3 shows by way of example such an arrangement in section. An intermediate flange 32 with its two sides shut off the filter plates 1 and 1' from the cavity in the press casing. For the rest, the construction is the same as in the case of the one-filter arrangement, and it thus becomes possible to let the filter plates rotate in the same or opposite directions.

I claim:

1. A filter press comprising a casing formed to receive a filter disc, a removable cover member for an edge portion of the casing to provide for the exchange of filter discs, a filter disc having a releasable impervious sector adapted to be rotatably mounted in said casing, and said casing being provided with inlet and outlet apertures through which material is supplied to and removed from the casing, said apertures being located opposite the position of the cover member with the edges of the apertures having liquid-tight engagement with the opposite faces of the filter disc, the relative location of said apertures and said removable cover member providing for the closing of said apertures through the engagement therewith of the releasable filter disc sector while an interchange of filter discs is made through the opening normally closed by the cover member.

2. A filter press comprising a casing formed to receive a filter disc, a removable cover member for an edge portion of the casing to provide for the exchange of filter discs, a driving worm journaled for rotation in said cover member, a filter disc having a releasable impervious sector and adapted to be rotatably mounted in said casing, said filter disc having a toothed periphery for engagement with said driving worm, and said casing being provided with inlet and outlet apertures through which material may be supplied to and removed from said casing, said apertures being located opposite the position of the cover member with the edges of the apertures having liquid-tight engagement with the opposite faces of the filter disc, the relative location of said apertures and said removable cover member providing for the closing of said apertures through the engagement therewith of said releasable filter disc sector while an interchange of filter discs is made through the opening normally closed by the cover member.

3. A filter press comprising a casing formed to receive a plurality of filter discs, a removable cover member for an edge portion of the casing to provide for the exchange of filter discs, filter discs having toothed edges and impervious removable sectors, said discs being adapted to be rotatably mounted in said casing, a plurality of driving pinions rotatably mounted in said cover member and having intermeshing engagement with the toothed peripheries of said filter discs, and said casing being provided with inlet and outlet apertures through which material may be supplied to and removed from said casing, said apertures being located opposite the position of the cover member with the edges of the apertures having liquid-tight engagement with the outer faces of the end filter discs in the series, the relative location of said apertures and said removable cover member providing for the closing of said apertures through the engagement therewith of removable filter disc sectors while an interchange of filter discs is made through the opening normally closed by the cover member.

4. A filter press comprising a casing formed to receive a filter disc, a removable cover member for the casing to provide for the exchange of filter discs, a filter disc having a releasable impervious sector adapted to be rotatably mounted in said casing, said casing being provided with inlet and outlet apertures through which material is supplied to and removed from the casing, the edges of the apertures having liquid-tight engagement with the opposite faces of the filter discs, and said releasable sector of the filter disc being arranged to close said apertures through direct engagement therewith while an interchange of filter discs is made through the opening normally closed by the cover member.

5. A filter press comprising a casing formed to receive a filter disc, a removable cover member for the casing to provide for the exchange of filter discs, a filter disc having a releasable impervious sector adapted to be rotatably mounted in said casing, said casing being provided with inlet and outlet apertures through which material is supplied to and removed from the casing, the edges of the apertures having liquid-tight engagement with the opposite faces of the filter disc, said impervious sector being arranged to close the apertures through its engagement therewith, and a locking rib member formed on the impervious sector for holding the sector in place during the interchange of filter discs.

In testimony whereof I have signed my name to this specification.

MAX KORFF.